United States Patent
Kandasamy et al.

(10) Patent No.: US 11,973,892 B2
(45) Date of Patent: Apr. 30, 2024

(54) USER INTERFACE WITH INTERACTIVE ELEMENTS HAVING DYNAMICALLY DETERMINED FUNCTIONALITY

(71) Applicant: INTUIT INC., Mountain View, CA (US)

(72) Inventors: Durga Muthumanickam Kandasamy, Mountain View, CA (US); Jahnavi Kocha, Mountain View, CA (US); Carli Lessard, Mountain View, CA (US); Quoc Phuong Nguyen, Mountain View, CA (US); Nithya Pari, Mountain View, CA (US); Robert Paul, Mountain View, CA (US); Andrew Schrage, Mountain View, CA (US); Eric Wong, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 30 days.

(21) Appl. No.: 17/235,717

(22) Filed: Apr. 20, 2021

(65) Prior Publication Data

US 2022/0337694 A1   Oct. 20, 2022

(51) Int. Cl.
| | |
|---|---|
| H04M 1/00 | (2006.01) |
| G06F 3/0488 | (2022.01) |
| G06F 40/279 | (2020.01) |
| H04M 1/724 | (2021.01) |
| H04M 15/00 | (2006.01) |
| H04W 4/24 | (2018.01) |

(52) U.S. Cl.
CPC .......... *H04M 1/724* (2021.01); *G06F 3/0488* (2013.01); *G06F 40/279* (2020.01); *H04M 15/41* (2013.01); *H04W 4/24* (2013.01)

(58) Field of Classification Search
CPC ..... H04M 1/724; H04M 15/41; G06F 40/279; G06F 3/0488; H04W 4/24
See application file for complete search history.

(56) References Cited

U.S. PATENT DOCUMENTS

| | | | |
|---|---|---|---|
| 2004/0167808 A1* | 8/2004 | Fredericks | G06Q 30/02 705/5 |
| 2018/0247354 A1* | 8/2018 | Pratt | H04L 47/10 |
| 2019/0340700 A1* | 11/2019 | Haas | G06Q 40/12 |
| 2020/0160321 A1* | 5/2020 | Arzumanyan | H04W 4/24 |
| 2020/0311729 A1* | 10/2020 | Matthews | G06Q 20/322 |

* cited by examiner

*Primary Examiner* — Pakee Fang
(74) *Attorney, Agent, or Firm* — Patterson + Sheridan, LLP

(57) ABSTRACT

Certain aspects of the present disclosure provide techniques for a method of displaying a user interface on a mobile device, comprising: receiving a transaction file; performing text recognition on the transaction file to extract one or more transaction elements; determining a transaction characteristic based on the one or more transaction elements; displaying a transaction characteristic user interface element within an interactive cell displayed in the user interface; receiving a user touch gesture associated with the interactive cell via the user interface; and displaying an action user interface element in response to receiving the user touch gesture, wherein the action user interface element is configured to perform an action based on the transaction characteristic associated with the interactive cell.

15 Claims, 11 Drawing Sheets

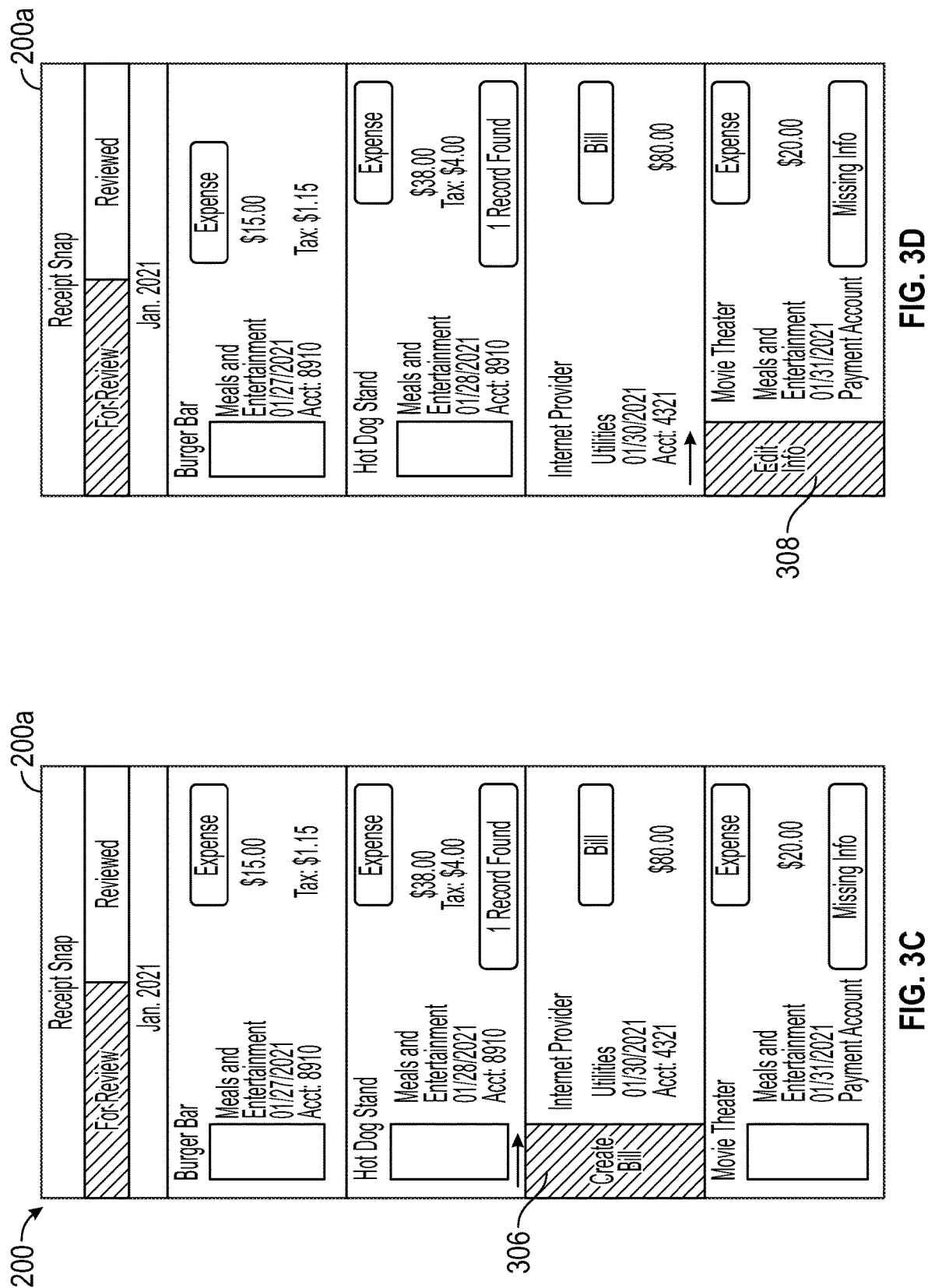

FIG. 5A

Receipt Snap

For Review | Reviewed

Jan. 2021

Burger Bar — Expense — $15.00
Meals and Entertainment
01/27/2021
Acct: 8910
Tax: $1.15

Undo — 502

Hot Dog Stand — Expense — $38.00
Meals and Entertainment
01/28/2021
Acct: 8910
Tax: $4.00

Internet Provider — Bill — $80.00
Utilities
01/30/2021
Acct: 4321

Movie Theater — Expense — $20.00
Meals and Entertainment
01/31/2021
Payment Account 200b
200

FIG. 5B

Receipt Snap

For Review | Reviewed

Jan. 2021

No Documents to Review

200a

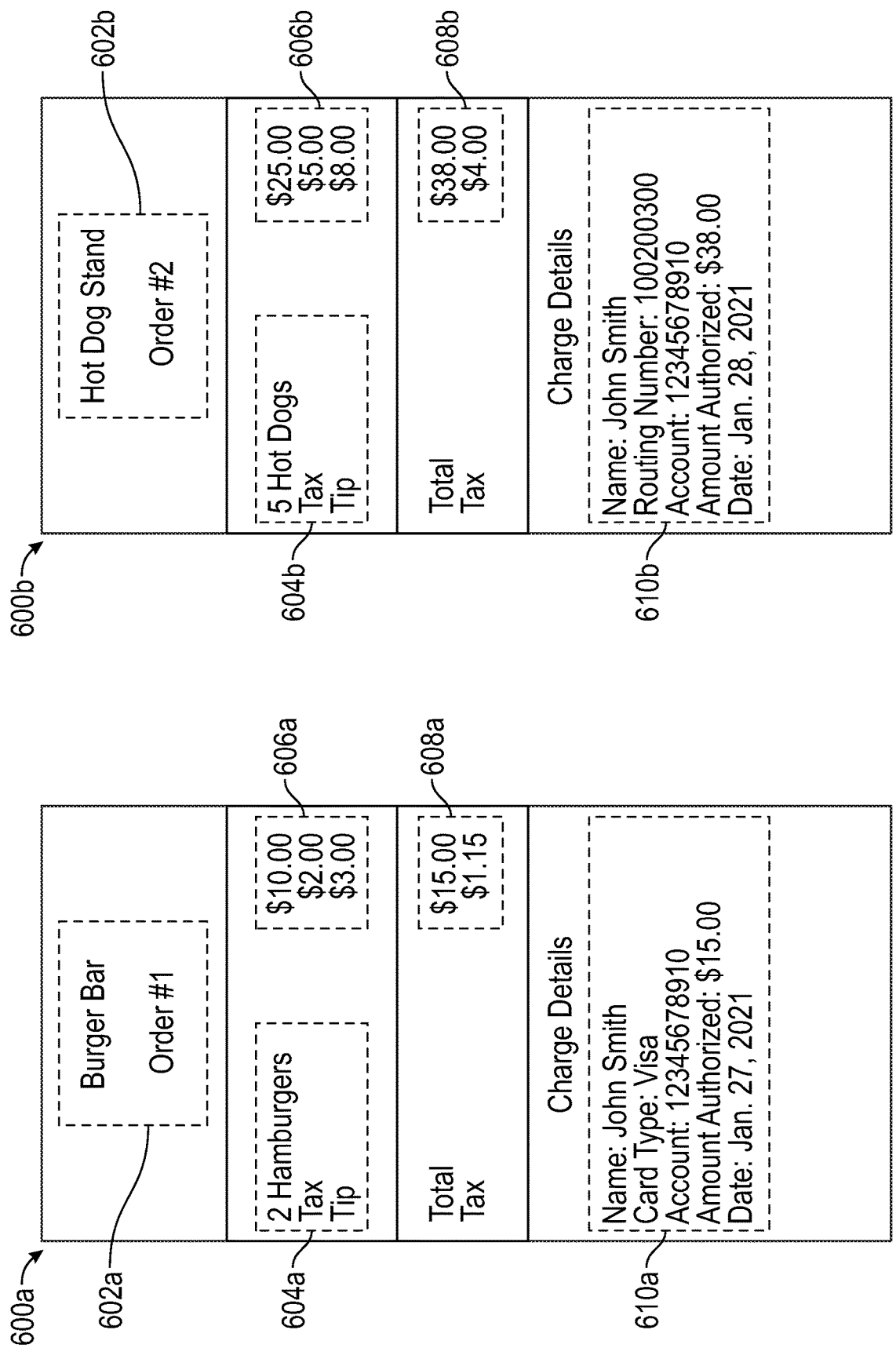

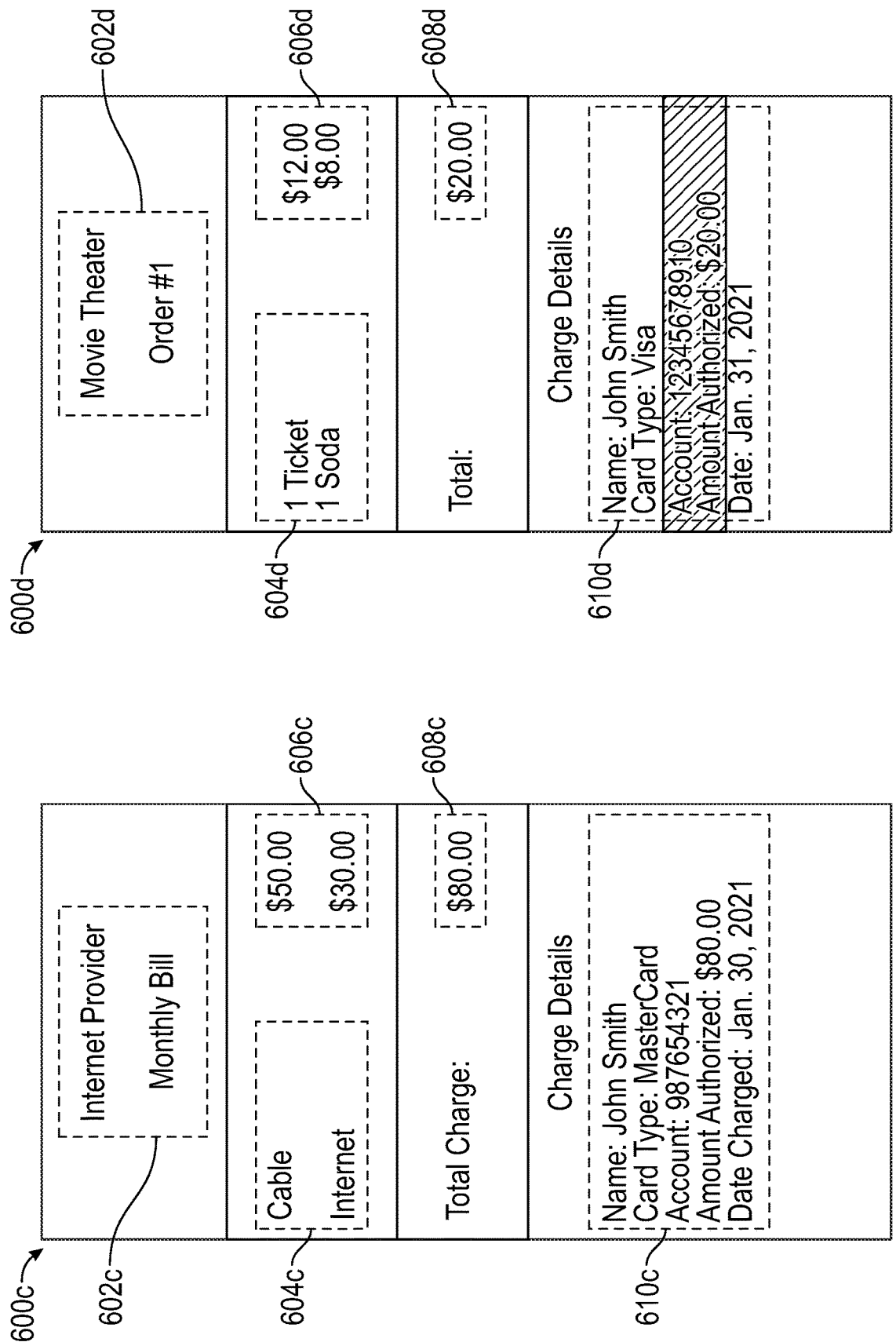

USER INTERFACE WITH INTERACTIVE ELEMENTS HAVING DYNAMICALLY DETERMINED FUNCTIONALITY

INTRODUCTION

Aspects of the present disclosure relate to user interfaces, and more specifically to interactive user interface elements whose functionality is dynamically determined based on features extracted from image data.

Complex data management systems that rely on digital as well as physical documents present many challenges to users. For example, electronic accounting requires importing, classifying, and otherwise interacting with large amounts of transactions, bills, expenses, and receipts, among other things, in both physical and digital formats. While personal electronic devices, such as smartphones, tablet computers, and the like, have increased the number of devices from which users may interact with data management systems, they have not conventionally improved the actual functionality of such systems. In many cases, the physical limitation of such devices, such as screen size, user input capabilities, and the like, actually present a more limited set of capabilities compared to more conventional interfaces—such as a desktop computer.

Accordingly, there remains a significant need to improve the functionality of user interfaces for electronic devices so that a user may interact with data management systems more effectively.

BRIEF SUMMARY

Certain embodiments provide a method of displaying a user interface on a mobile device, including: receiving a transaction file; performing text recognition on the transaction file to extract one or more transaction elements; determining a transaction characteristic based on the one or more transaction elements; displaying a transaction characteristic user interface element within an interactive cell displayed in the user interface; receiving a user touch gesture associated with the interactive cell via the user interface; and displaying an action user interface element in response to receiving the user touch gesture, wherein the action user interface element is configured to perform an action based on the transaction characteristic associated with the interactive cell.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer-readable storage medium comprising code for performing the aforementioned method as well as those further described herein; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 3A-3D depict an example user interface containing one or more interactive cells displaying an action user interface component after receiving a touch gesture input from the user.

FIGS. 5A-5B depict an example user interface containing one or more interactive cells corresponding to one or more created or matched transaction records.

FIGS. 6A-6D depict example transaction files containing one or more transaction elements.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
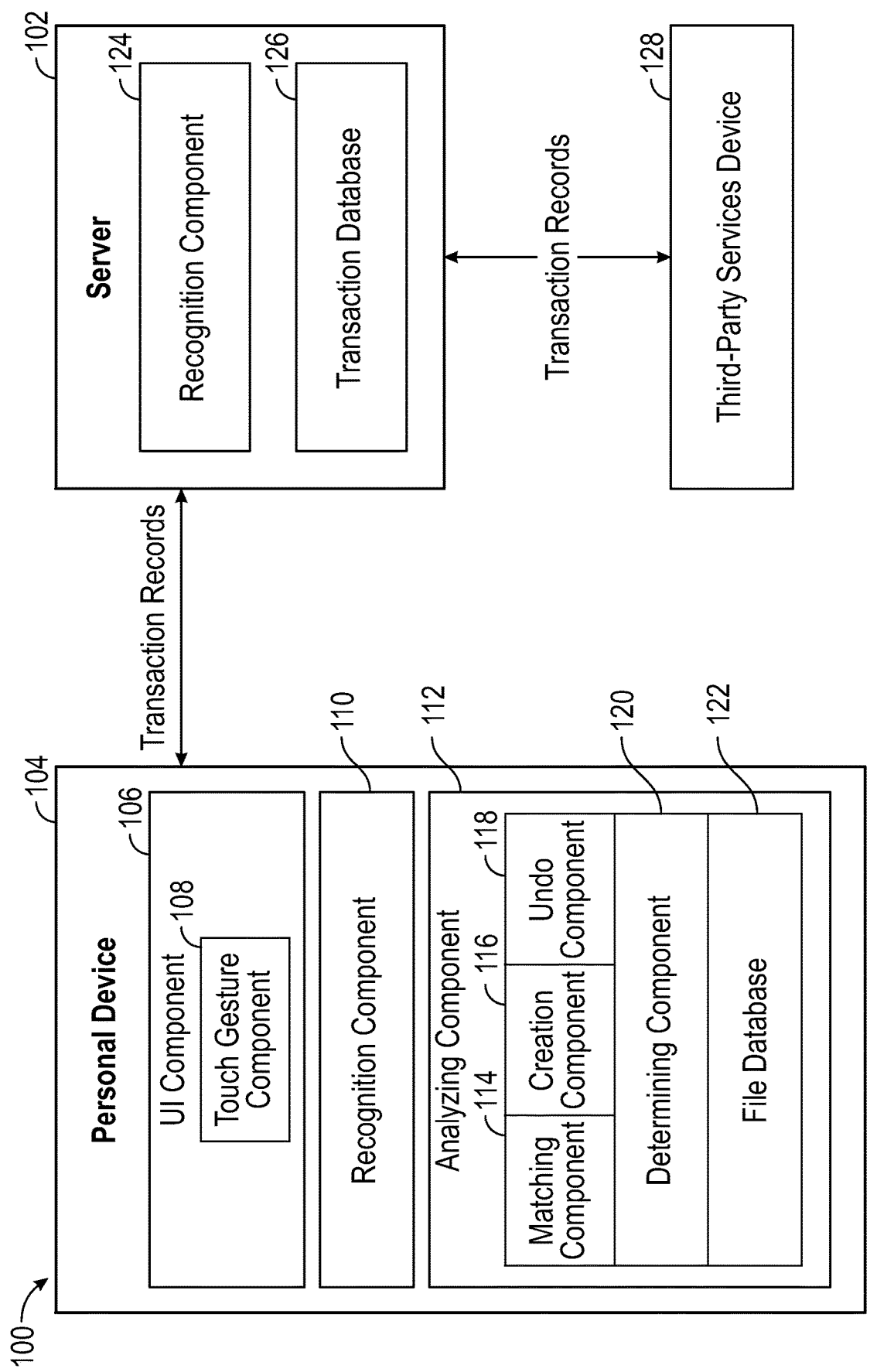
FIG. 1 depicts an example computing environment.

Aspects of the present disclosure provide apparatuses, methods, processing systems, and computer-readable mediums for providing interactive user interface elements whose functionality is dynamically determined based on features extracted from image data.

Various data management applications allow users to interact with physical and digital data to some useful end. For example, accounting software allows users to keep track of a myriad of transaction types and associated documents, such as bills, expenses, receipts, invoices, and the like. Recently, users have begun to leverage the capabilities of increasingly advanced personal electronic devices, such as smart phones, smart wearable devices, tablet computers, and other mobile personal devices, to interact with data management applications. However, the experience of using such devices is often compromised as compared to a more conventional interface, such as that provided by a desktop computer. Embodiments described herein leverage the technical capabilities of modern devices to provide an improved user interface, and therefore overcome technical and experiential limitations with conventional systems.

Generally, embodiments described herein may leverage various technical capabilities of mobile electronic devices to provide an improved user interface. In particular, embodiments described herein provide a technical solution to the technical problem of providing access to a wide range of programmatic interactions (e.g., with data records in a data management application) within a user interface constrained in size and input capability. Embodiments described herein may receive, for example, a transaction file, classify the file as a particular type, and then assign a particular action to a user interface element based on the particular type. Then, when a user interacts with the user interface element, only a relevant interaction option (or options) is provided based on the classified type, rather than a generic list of options such as in conventional interfaces. Critically, this allows for the limited user interface space of certain mobile electronic devices to be used more effectively. Further, errors from miss-selection of inapplicable options (such as where the options are forced into a small list that is hard to navigate using a touch-based interface) are reduced, which saves time (and thus power), processing cycles, and the like.

In these ways, the embodiments herein improve upon conventional methods of displaying user interfaces, which are limited in their displaying of user interface elements due to limited space of personal devices, leading to additional processing power and battery loss. For example, conventional methods may focus on requiring the user to fill in transaction data, presenting multiple category elements and multiple actions for a user to choose from for each document, and a separate view to confirm each transaction because all the information and options cannot practically fit onto the user interface of a personal device at the same time. Additionally, by presenting multiple options for each category, action, or confirmation along the way, conventional user interfaces also provide more opportunities for user error. For instance, these performance problems with conventional methods of displaying user interfaces require more time, more decisions, and more input from the user, inevitably resulting in more user errors. These extra user errors lead to higher processing requirements due to inaccurate information, incorrect decisions made by the user, duplicative records, and multiple different user interfaces required for the user to input all the original information, as well as to return and correct the previous errors.

As described in more detail below, providing interactive user interface elements whose functionality is dynamically determined based on features extracted from image data not only reduces the information required from the user by determining a transaction characteristic and associated action for the user, but also more efficiently uses space on the personal device (e.g., on an output display) as well as reduces the required processing resources. For example, after transaction elements are extracted from a transaction file using a text recognition process, the personal device of the user may automatically determine a transaction characteristic and an associated action, therefore providing a path for the user by narrowing his or her options and reducing the information required to be input, which leads to fewer corresponding user errors. Additionally, the user interface would allow the user to confirm the action for each transaction file in one user interface view, without requiring the user to traverse multiple user interfaces in order to view all the necessary information, thereby more efficiently utilizing the space of the personal device's interface and reducing the processing resources needed to confirm and perform the actions.

Example System of Personal Devices and Server for Displaying a Dynamic User Interface FIG. 1 depicts an example computing environment 100 for displaying a user interface (UI) on a personal device (e.g., personal device 104).

As illustrated, the example computing environment 100 includes a server 102 interacting with a personal device 104 and, in some embodiments, a third-party services device 128. In this example, the personal device 104 includes a UI component 106, a recognition component 110, and an analyzing component 112. UI component 106 further includes a touch gesture component 108. Analyzing component 112 further includes matching component 114, creation component 116, undo component 118, determining component 120, and file database 122.

In this example, the server 102 includes recognition component 124 and transaction database 126. Recognition component 124 may perform text recognition on images received at the server 102 in order to extract one or more transaction elements. Transaction database 126 may store transaction records associated with one or more transaction files, which are files associated with a transaction, such as a document image or an emailed receipt. These transaction records stored in transaction database 126 may further be associated with one or more transaction characteristics, such as a transaction category, and/or one or more transaction elements. In some embodiments, the transaction file may be associated with metadata, such as a category of the transaction, a topic of the transaction, a date the transaction occurred, a location of the transaction, or other aspects of the transaction, which may be extracted as one or more transaction characteristics and/or one or more transaction elements. The transaction records may further be downloaded by personal device 104 or third-party services device 128 for processes described below. Additionally, transaction database 126 may be updated with new transaction records or modifications to transaction records already existing in transaction database 126. In some cases, based on an action performed by personal device 104, one or more transaction records may be removed from transaction database 126 or modified within transaction database 126.

The personal device 104 can include a mobile device such as a computer, laptop, tablet, smartphone, or smart wearable device, to name a few examples. In this example, the personal device 104 may allow for a user to capture transaction files through a camera and store them on the personal device 104 at file database 122. In one embodiment, the personal device 104 may receive the transaction files from another personal device or server 102. The personal device 104 may also send transaction files to server 102.

Additionally, UI component 106 may display one or more interactive cells associated with a transaction file, as described below with respect to FIG. 2. In general, a transaction file may be any record associated with a transaction, including a document image, an e-mail, or another electronic file. A transaction file may further include one or more attachments associated with the transaction. Further, the UI component 106 may receive a touch gesture associated with an interactive cell from the user at touch gesture component 108, which may cause the personal device to perform an action associated with the interactive cell based on the transaction characteristic associated with the interactive cell. In some embodiments, the interactive cells may be table cells.

The personal device 104 further includes recognition component 110, which may perform text recognition, such as optical character recognition (OCR), on certain transaction files captured or received at the personal device 104. The text extracted from the transaction files by recognition component 110 may then be used by analyzing component 112.

Personal device 104 further includes analyzing component 112. Analyzing component 112 may perform one or more functions with respect to transaction files or extracted text sent by personal device 104. Analyzing component 112 further includes matching component 114, creation component 116, undo component 118, determining component 120, and file database 122, which may determine and perform actions based on transaction files.

Analyzing component 112 may receive extracted text including one or more transaction elements associated with one or more transaction files. The transaction elements may be received from recognition component 110 after text recognition is performed on the one or more transaction files. Personal device 104 may further download one or more transaction records from transaction database 126 of server 102. Analyzing component 112 may analyze the one or more extracted transaction elements from the transaction files based on the downloaded transaction records.

Determining component 120 of analyzing component 112 may determine a transaction characteristic from the extracted data by a variety of methods. For example, as described above, the transaction characteristic may be metadata extracted from the transaction file, which the determining component 120 recognizes as a transaction characteristic. As another example, the determining component 120 may determine that one or more transaction elements or other data associated with the transaction file indicate a transaction characteristic based on pattern-matching methods. As yet another example, data extracted from the transaction file may be provided to a machine learning model within determining component 120, which may predict a transaction characteristic based on the extracted data. In another example, the determining component 120 may use a transaction file template to determine a location of where a transaction characteristic may be located in the transaction file, and may determine that data from that location contains a transaction characteristic.

Determining component 120 may further determine an action to perform based on analyzing the transaction records. For example, determining an action to perform may be based on the determined transaction characteristic. For instance, if the transaction category and/or transaction elements indicate that a transaction record created based on the extracted transaction elements would match a transaction record downloaded from transaction database 126, determining component 120 may determine the action to perform is to match the transaction file associated with the transaction elements to the downloaded transaction record. In some embodiments, determining component 120 may also determine to supplement the information of the transaction record in transaction database 126 with one or more extracted transaction elements. As another example, determining component 120 may determine the action to perform is to create a transaction record associated with a transaction file if the extracted transaction elements indicate that the transaction record created would not match a record downloaded from transaction database 126.

After determining component 120 determines an action, UI component 106 may associate the determined action with an interactive cell displayed on a user interface.

The UI component 106 may display the certain UI elements associated with the transaction files on a user interface of the personal device 104, such as on a display screen. The UI elements may include one or more of an action user interface element, a transaction characteristic user interface element, an incompletion user interface element, a transaction element user interface element, and a document preview user interface element, as some examples, as depicted with respect to FIGS. 2A-2B, 3A-3D, and 5A-B.

The determined action and corresponding action user interface element may vary depending on a view of the user interface the user has accessed. For instance, in a first user interface view, the action user interface element may indicate that the determined action is to create a transaction record or match a transaction file to a record downloaded from transaction database 126. In a second user interface view, the action user interface element may indicate that the determined action is to undo the creation of a transaction record or matching of a transaction file.

After receiving the touch gesture, personal device 104 may perform the determined action associated with the interactive cell that received the touch gesture, as described below with respect to FIG. 3. For some interactive cells, the determined action may be to create a transaction record associated with the transaction file by creation component 116. For other interactive cells, the determined action may be to match the transaction file and/or associated transaction elements to a downloaded transaction record by matching component 114. UI component 106 may further display a second interactive cell associated with the transaction file after the personal device performs an action, as described below with respect to FIG. 5. The touch gesture component 108 may also be configured to receive a touch gesture corresponding to the second interactive cell. Determining component 120 may further determine that an action with respect to the second interactive cell is to undo, by undo component 118, the previous action, as further described below with respect to FIG. 5.

In some embodiments, the downloaded transaction records may originate in a third-party services device 128. For example, a third-party may transact with the user of the personal device 104 and create one or more transaction records associated with the user. In that example, the server 102 may download the one or more transaction records associated with the user and store them in transaction database 126. The personal device 104 may download those transaction records to be used by analyzing component 112 when creating records or matching transaction files.

Example User Interface Displaying Interactive Cells and User Interface Elements

Figure 2A:
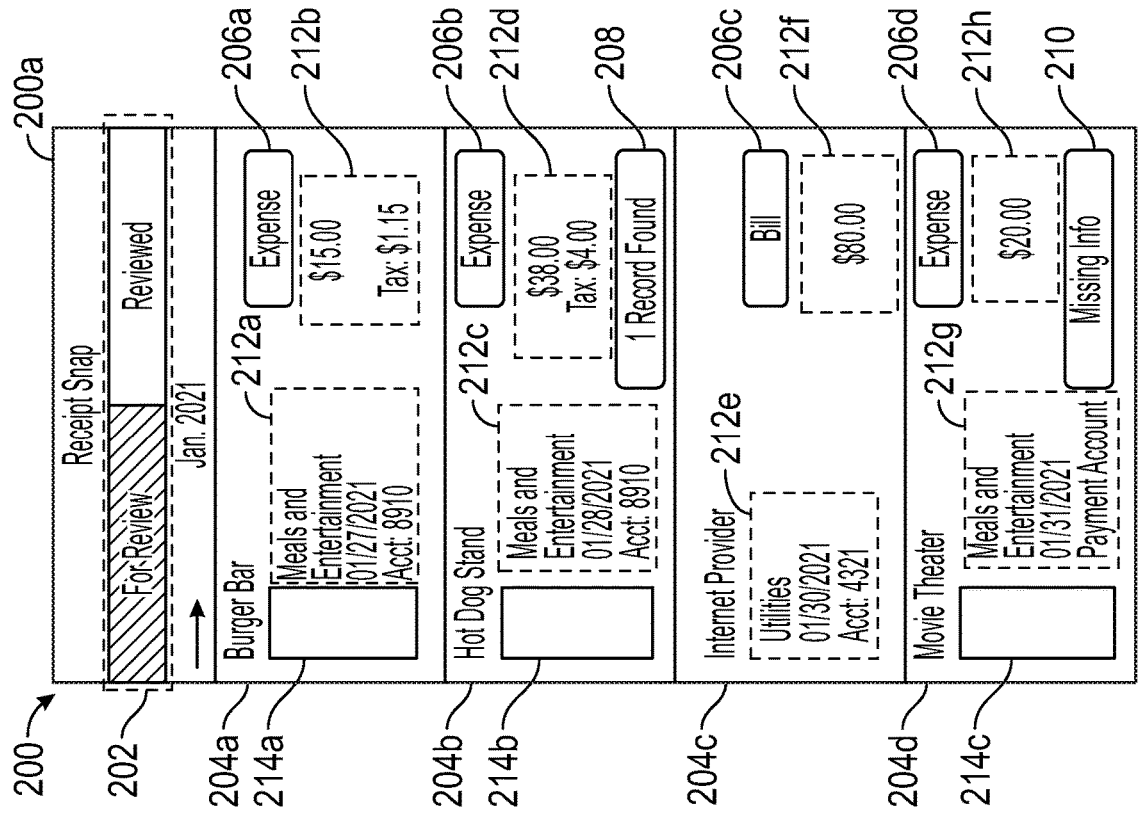
FIGS. 2A-2B depict an example user interface containing one or more interactive cells corresponding to one or more transaction files.
Figure 2B:
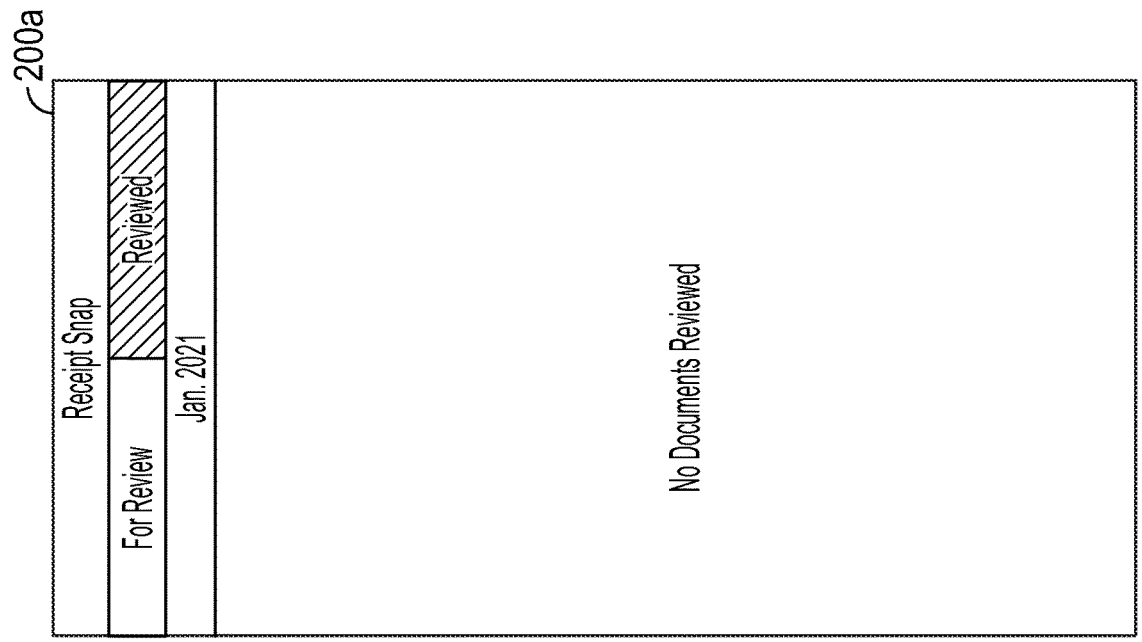

FIGS. 2A-2B depict example user interface 200 containing interactive cells 204a-204d corresponding to one or more transaction files containing one or more transaction elements that are received by a personal device (e.g., personal device 104 of FIG. 1).

As described above, after the personal device receives one or more transaction files and extracts one or more transaction elements for each transaction file, the personal device 104 may display one or more interactive cells 204a-204d on user interface 200.

The extracted transaction elements may be used by the personal device to display one or more interactive cells 204a-204d. Each interactive cell may be interacted with by a user of the personal device (e.g., through UI component 106 of FIG. 1). In this depicted example, each interactive cell further displays transaction characteristic user interface element (e.g., user interface elements 206a-206d), a matching transaction user interface element (e.g., user interface element 208), a transaction element user interface element (e.g., user interface elements 212a-212h), a transaction preview user interface element (e.g., user interface elements 214a-214c), or an incompletion user interface element (e.g., user interface element 210). In some embodiments, the interactive cells may be tabular.

The user interface elements may be automatically determined and displayed by the personal device on the user interface 200 in order to provide information about each respective transaction file to the user.

For example, an interactive cell may display a transaction characteristic user interface element indicating a transaction characteristic (e.g., one of user interface elements 206a-206d) of the corresponding transaction file. A transaction characteristic may be a characteristic of the transaction such as a transaction category, a topic associated with the transaction, an organization associated with the transaction, a time period associated with the transaction, or another characteristic. In this depicted example, the transaction characteristics indicated in user interface elements 206a-206d are transaction categories. Transaction characteristic user interface elements may be referred to as transaction category interface elements if the transaction characteristic is a transaction category.

Additionally, if the personal device determines that the transaction elements corresponded to an existing record downloaded by the personal device, the personal device may display a matching transaction user interface element showing the corresponding record was found (e.g., user interface element 208). Even further, if the personal device is unable to obtain all necessary transaction elements to create a transaction record based on the transaction file, then the personal device may display an incompletion user interface element denoting that more information is necessary to complete the record (e.g., user interface element 210). The interactive cell may also display one or more transaction element user interface elements representing one or more transaction elements associated with a transaction file (e.g., user interface elements 212a-212h). If an image of the transaction file was obtained by the personal device, the interactive cell may also display a small representation of the image in a transaction preview user interface element (e.g., user interface elements 214a-214c).

Additionally, user interface 200 may have one or more tabs (e.g., "For Review" represented by user interface view 200a and "Reviewed" represented by user interface view 200b). User interface 200 may be configured to switch between user interface views 200a and 200b after receiving a touch gesture from the user to a tab user interface element 202. Further, when the personal device receives the transaction elements and determines actions corresponding to the transaction file based on the transaction category, the interactive cells 204a-204d may appear in the "For Review" tab until the user inputs a touch gesture to one or more interactive cells. After the user inputs a touch gesture, the interactive cell that received the touch gesture may disappear from the "For Review" tab and appear in the "Reviewed" tab. Further, if the user inputs a touch gesture to an interactive cell in the "Reviewed" tab, the interactive cell will disappear from the "Reviewed" tab and return to the "For Review" tab, as further described with respect to FIG. 5. While "For Review" and "Review" are used as titles for simplicity, one of ordinary skill in the art would recognize that these are only examples of titles and other titles can be used.

Figure 3B:
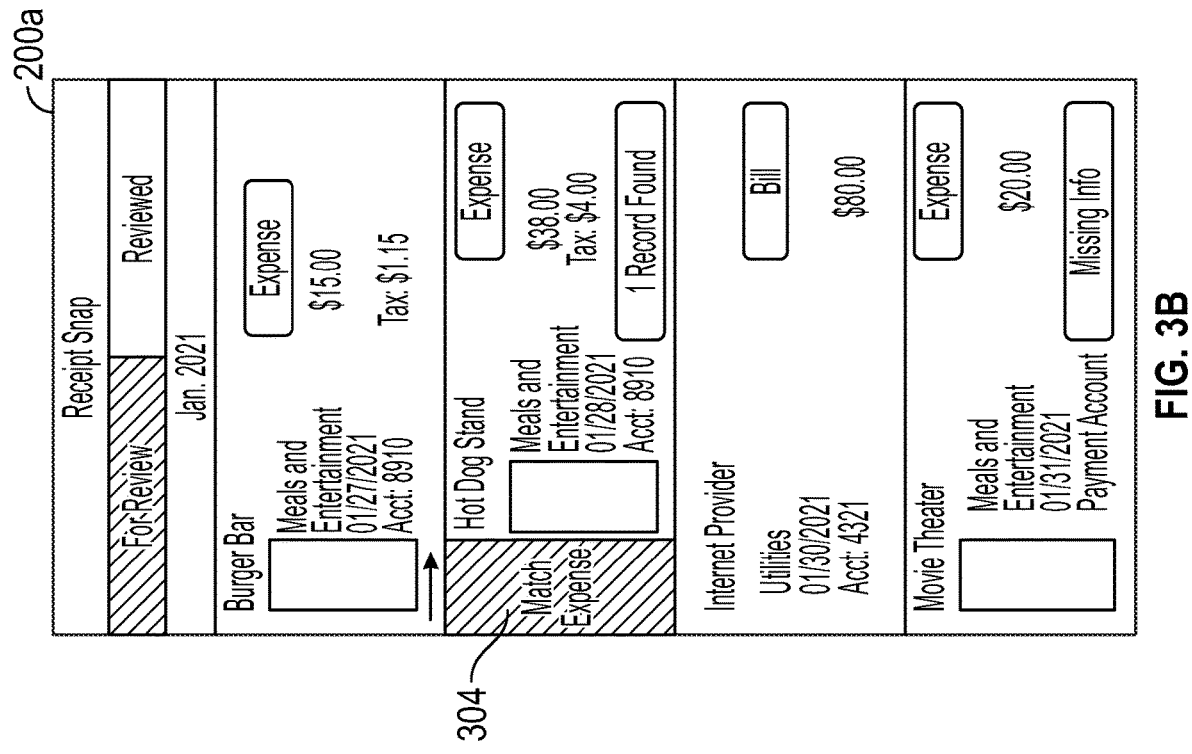
Figure 3A:
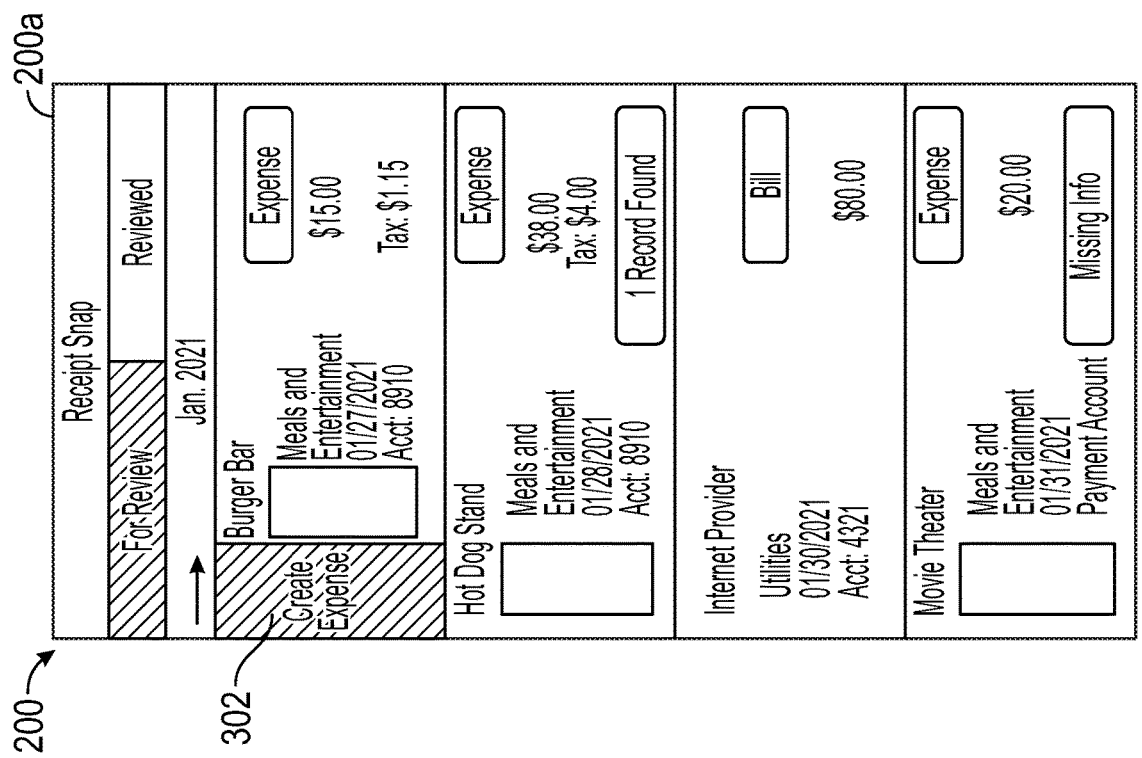

Example User Interface Displaying Input Touch Gestures to Perform a Determined Action FIGS. 3A-3C depict example user interface 200 containing one or more interactive cells (e.g., interactive cells 204a-204d of FIG. 2) receiving a touch gesture input from the user to display an action user interface element configured to cause a personal device (e.g., personal device 104 of FIG. 1) to perform an action.

As described above, each interactive cell may correspond to a transaction file for which personal device automatically determines an action to perform. The determined action may be based on the transaction category, such as a bill or expense, and if the personal device matched the transaction file to an existing downloaded transaction record. The transaction category may be shown in the interactive cell by a transaction category user interface element (e.g., user interface elements 206a-d of FIG. 2). Whether the transaction file was determined to match an existing record by the personal device may also be shown by a matching transaction user interface element (or lack thereof), such as user interface element 208 of FIG. 2.

The personal device may further display an action user interface element, such as one of user interface elements 302, 304, or 306, in an interactive cell in response to receiving an input touch gesture from the user to user interface 200. The action user interface element may be configured to cause the personal device to perform the determined action corresponding to the interactive cell upon receiving the touch gesture. In some examples, the determined actions may include creating an expense record, creating a bill record, matching a transaction file and/or transaction elements to an existing downloaded expense record, or matching a transaction file and/or transaction elements to an existing downloaded bill record.

For example, the user may swipe an interactive cell (e.g., interactive cell 204a of FIG. 2) horizontally from left to right on a touchscreen display of the personal device. In response, the personal device may display an action user interface element 302 and may create an expense record corresponding to a transaction file associated with the interactive cell. Similarly, the user may swipe a second interactive cell indicating that a matching record was found (e.g., interactive cell 204b of FIG. 2) from left to right on the touchscreen of the user interface. In response, the personal device may display an action user interface element 304 configured to cause the personal device to match the transaction file corresponding to the interactive cell to the existing expense record. In some embodiments, when the user swipes the interactive cell to match a record, the transaction elements associated with the transaction file may also be matched to the existing record. Further, the user may swipe a third interactive cell (e.g., interactive cell 204c of FIG. 2) from left to right on the user interface. In response, the personal device may display an action user interface element 306 configured to cause the personal device to create a bill record corresponding to a transaction file associated with the interactive cell.

In some embodiments, when an expense or bill record is created, the personal device may send the created record to a server, such as server 102 of FIG. 1, to store the expense or bill record in a transaction database (e.g., transaction database 126 of FIG. 1). Those created records may then be downloaded later by personal device or another personal device after other transaction files are received.

In one embodiment, the user may swipe a fourth interactive cell (e.g., interactive cell 204d of FIG. 2) displaying an incompletion user interface element. In response, the personal device may display an action user interface element 308 configured to cause the personal device to display a separate UI view where the user may edit transaction elements associated with the or transaction file associated with the interactive cell, as described below in FIG. 4. In another embodiment, when an interactive cell displaying an incompletion user interface element receives a touch gesture from the user, the user interface 200 may display an indication that no determined action can be performed with the current transaction elements. In that embodiment, the user may input a touch gesture, such as a double tap, to the interactive cell in order to input information corresponding to the required transaction element in a separate user interface view.

In one embodiment, the action user interface element may be configured to only cause the personal device to perform the determined action after receiving a second touch gesture to the interactive cell.

In some embodiments, the interactive cell may display information corresponding to one or more extracted transaction elements such as a name associated with the transaction, the account number, the date of the transaction, the total charge associated with the transaction, and the tax associated with the transaction. The information may be shown in one or more transaction element user interface elements (e.g., user interface elements 312a-312h).

In this embodiment, after the input touch gesture is received, the action user interface element partially obscures the interactive cell, as shown by action user interface elements 302a-302d partially taking the space of their respective interactive cells. In other embodiments, the action user interface element may entirely obscure the interactive cell. The action user interface may also display a text element describing the action associated with the action user interface (e.g., "Create Expense", "Match Expense", "Create Bill", or "Match Bill").

Additionally, the "For Review" tab as displayed in user interface view 200a may display only the interactive cells for transactions in a specific time period (e.g., January 2021). In other embodiments, the "For Review" tab may display interactive cells for transactions according to other criteria, such as for transactions associated with a certain vendor, transactions with a minimum total charge threshold, or transactions associated with a certain transaction category.

Further, while only four interactive cells are displayed in user interface 200 for simplicity, any number of interactive cells could be displayed in user interface 200.

Example User Interface for Editing Transaction Elements in Transaction Records

Figure 4:
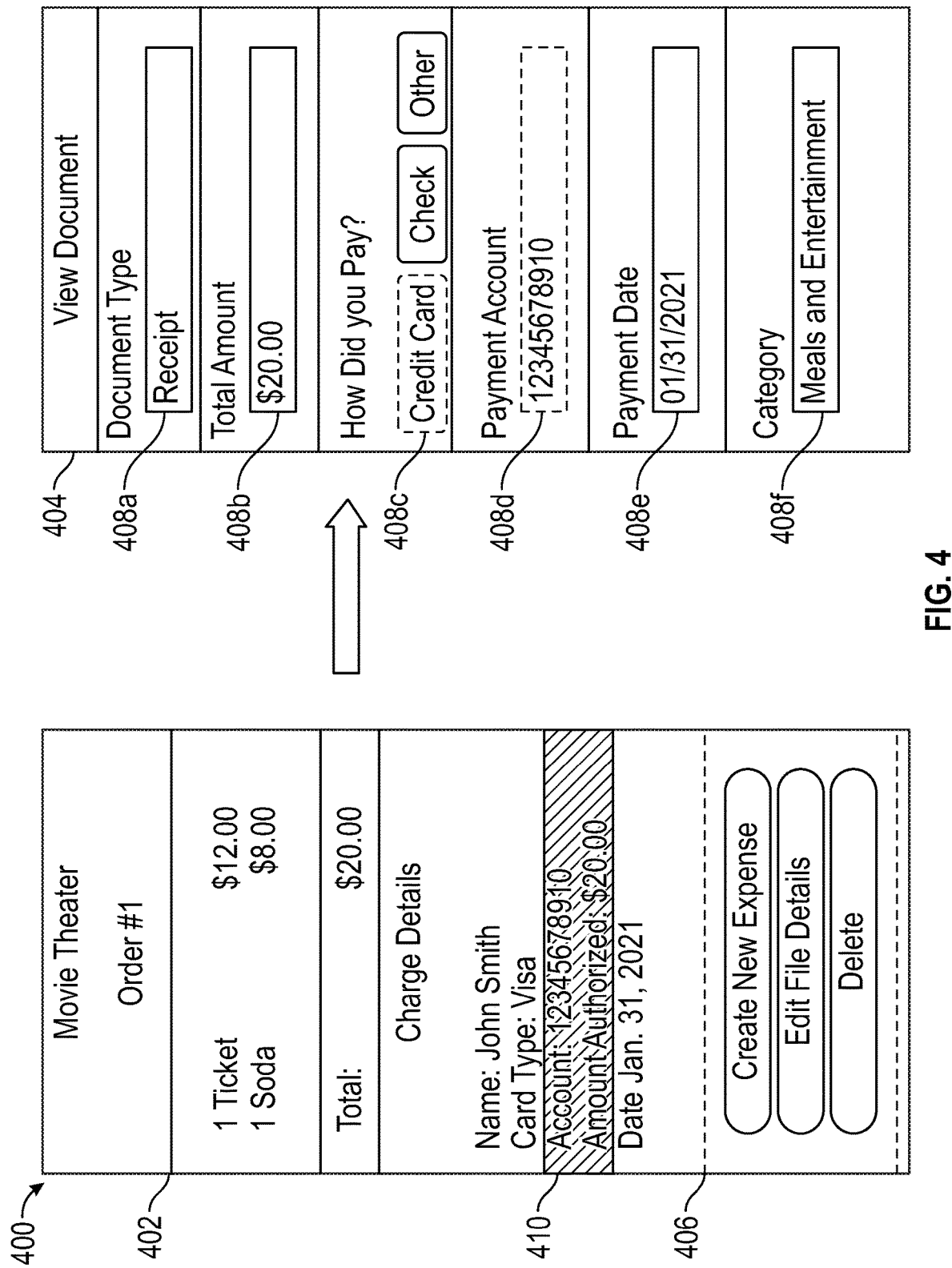
FIG. 4 depicts an example user interface for viewing transaction files and editing transaction elements.

FIG. 4 depicts example user interface 400 for viewing transaction files received by a personal device (e.g., personal device 104 of FIG. 1) and editing transaction elements.

As described above with respect to FIG. 1, personal device may extract one or more transaction elements from a transaction file. In some cases, the personal device captures images and process them with a recognition component (e.g., recognition component 110 in FIG. 1). The personal device may also analyze the transaction files in order to extract the one or more transaction elements.

However, for various reasons, transaction elements that are extracted by the personal device may need to be edited. For instance, in some cases, the recognition component may not properly determine the text from a transaction file, which the user may want to correct. In other cases, the recognition component may not have been able to determine any text from the transaction file due to obscuring or blurring of the text, which may lead to the user needing to supplement the information extracted from the transaction file. Further yet, the extracted elements from another electronic transaction file may not be properly extracted or analyzed by the recognition component of the personal device by the recognition component.

As described above with respect to FIG. 2, the personal device may also display an interactive cell corresponding to each transaction file, which the user may input a touch gesture to in order to cause the personal device perform a determined action. If an incompletion user interface element (e.g., user interface element 210 of FIG. 2) is displayed on the interactive cell, the user may be indicated that one or more transaction elements are missing and may be prompted to manually input those transaction elements to user interface 400.

In some cases, the personal device may display user interface 400 after receiving a touch gesture, such as a double tap, to an interactive cell. In other cases, the personal device may display user interface 400 after the user selects an option from a drop down menu.

After the personal device receives a selection by the user to display user interface 400, the personal device may display a transaction file 402 associated with the indicated interactive cell (e.g., one of interactive cells 204a-204d in FIG. 2). In this example, user interface 400 may further display an interactive menu 406 at the bottom of user interface 400 indicating various actions a user may take with regard to a transaction record associated with transaction file 402. For instance, instead of inputting a touch gesture to the interactive cell in the user interface to create or match a record, the user may input a touch gesture, such as a tap, to the interactive menu 406 at "Create New Expense" to cause the personal device to create a new transaction record based on the transaction file 402.

Further, the user may also input a touch gesture to the interactive menu 406 to delete the transaction file from the personal device. While "Create New Expense", "Edit File Details", and "Delete" are shown for simplicity, different prompts and/or different actions may be associated with interactive menu 406.

The user may also input a touch gesture to interactive menu 406 at "Edit File Details" to cause the user to display editing view 404. Editing view 404 may display one or more fields 408 where a user may input or change a transaction element associated with a transaction record corresponding to transaction file 402.

For example, the personal device may automatically populate determined transaction elements of transaction file 402 into the fields 408a-408f (e.g., "receipt" into field 408a, "$20.00" into field 408b, "01/31/2021" into field 408e, and "Meals and Entertainment" into field 408f). If the user wished to change any of the known transaction elements, he or she could input an adjusted transaction element into the field to replace a previous transaction element.

Further, in some embodiments, the personal device may not extract all transaction elements properly or at all due to problems with the transaction file (e.g., portion 410 of transaction file 402 that is obscured). In those cases, the fields corresponding to transaction elements that were not extracted may not be automatically populated (e.g., fields 408c and 408d). The user may be prompted to fill in the transaction elements by an incompletion user interface element (e.g., user interface element 310 in FIG. 3) shown by the personal device.

After receiving the modifications at the editing view 404, the personal device may update the interactive cell based on the modifications to the transaction elements. The updates may include the interactive cell no longer displaying an incompletion user interface element if the personal device received all necessary transaction elements to create or match a transaction record. The updates may further include the interactive cell displaying one or more transaction elements associated with the transaction file 402 that had not previously been displayed. Even further, the updates may include determining an action and displaying an action user interface element configured to cause the personal device to perform the action, if the personal device did not have the required transaction elements to make a determination before receiving the modifications.

In some embodiments, the personal device may determine a new action based on the changed transaction elements. For example, based on a first set of transaction elements, the personal device may search the set of existing transaction records downloaded from the server and identify a matching transaction record, causing the personal device to determine to match the transaction file and/or transaction elements to the matched transaction record. However, if the user edits the transaction elements to a second set of transaction elements, the personal device may search the set of existing transaction records after receiving the modifications and may not identify a matching transaction record, which may cause the personal device to determine to create a new transaction record based off the transaction file and display an action user interface element configured to create the new transaction record after receiving a touch gesture.

In other embodiments, the personal device may search the set of existing transaction records and not identify a matching transaction record. However, if the user edits the transaction elements to a second set of transaction elements, the personal device may search the set of existing transaction records after receiving the modifications and may identify a matching transaction record, which may cause the personal device to determine to match the transaction file and/or transaction elements to the matching transaction record and display an action user interface element configured to match the transaction file and/or transaction elements to the matching transaction record after receiving a touch gesture.

Through user interface 400, the user may confirm that all transaction elements are accurate, or change transaction elements if they are not accurate. In this way, the user can have confidence that all records will remain accurate, even if certain transaction elements are not initially accurate.

Example User Interface Displaying Interactive Cells Corresponding to Created or Matched Transaction Records FIGS. 5A-5B depict separate views of example user interface 200 containing one or more interactive cells (e.g., interactive cells 204a-204d in FIG. 2) corresponding to one or more created or matched transaction records based on input touch gestures to user interface 200.

After a personal device (e.g., personal device 104 of FIG. 1) receives one or more touch gestures input to one or more interactive cells (e.g., interactive cells 204a-204d), the personal device may display an action user interface element, (e.g., one of user interface elements 302a-302d in FIG. 3) configured to cause the personal device to create a transaction record corresponding to the interactive cell or match a transaction file and/or transaction elements to an existing transaction record. After a transaction record is matched or created, the personal device may no longer display the corresponding interactive cell in the "For Review" tab and may instead display the interactive cell in the "Reviewed" tab. As described above, each interactive cell corresponds to a transaction file for which the personal device determined an action to perform. The determined action may be based on the transaction category (e.g., a bill or expense) and if a corresponding transaction file matches an already existing transaction record.

The "Reviewed" tab may display one or more user interface elements that were shown in the "For Review" tab. For example, the "Reviewed" tab may show a transaction category user interface element for each interactive cell, one or more transaction element user interface elements for each interactive cell, a transaction preview user interface elements, and/or an action user interface element for each interactive cell.

Like in the "For Review" tab, each interactive cell in the "Reviewed" tab may be interacted with by a user of the personal device. Further, each interactive cell may allow the user to input a touch gesture (e.g., a swipe or tap) to the personal device to display an action user interface element (e.g., user interface element 502) configured to cause the personal device to perform an action with respect to a corresponding transaction record. For instance, the determined action may be to undo the creation of an expense transaction record previously created by the personal device, to undo the creation of a bill transaction record previously created by the personal device, to undo the matching of a transaction file and transaction elements to a previously existing expense record previously existing, or to undo the matching of a transaction file and transaction elements to a previously existing bill record.

After receiving the input touch gesture to undo a previously performed action corresponding to the interactive cell, the personal device may no longer display the interactive cell in the "Reviewed" tab and instead display it in the "For Review" tab. In other embodiments, after receiving the input touch gesture to cause the personal device to undo a previously performed action corresponding to the interactive cell, the personal device may remove the interactive cell from all tabs.

Therefore, by using the "Review" tab of user interface 200, a user of the personal device may undo previous actions by the personal device in order to make sure that all transaction records are accurate and accounted for. In this way, the user can make sure that no unintended transaction records are accounted for and can also undo the creation or matching of a record so that transaction elements can be edited (e.g., in user interface 400 of FIG. 4).

Example Transaction Files Containing One or More Transaction Elements

FIGS. 6A-6D depict example transaction files 600 containing one or more transaction elements that are received by a personal device (e.g., personal device 104 of FIG. 1).

As illustrated, each of transaction files 600a-600d represent a particular transaction document, such as a receipt, a bill, or an invoice, containing transaction data regarding a respective transaction. Transaction files may include any file representing a transaction, such as a document image or e-mail. The transaction data may be found in one or more transaction elements in the file (e.g., transaction elements 602a-602d, 604a-604d, 606a-606d, 608a-608d, and 610a-610d). A transaction element may represent only one piece of transaction data (e.g., each of transaction elements 608a-608d include a total amount charged to an account, where 608a-608b also include a tax associated with the total amount charged) or may represent more than one piece of transaction data (e.g., transaction elements 610a-610d represent the name of an account holder, a card type, an account number, an amount authorized, and a date of a transaction).

A transaction element may represent one or more pieces of transaction data (e.g., name of a transacting entity, items transacted, charges of individual items, a total charge, a tax amount, a description of the individual items, name of an account holder, a card type, an account number, an amount authorized, a date of a transaction, etc.) relevant to the transaction that may later be used by the personal device in determining an action related to the transaction file and displaying an action user interface element configured to cause the personal device to perform that action. While only certain transaction elements are shown in transaction files 600a-600d, other transaction elements may be included in other transaction file types.

In some cases, a transaction file may be obscured or unclear in some portions of the transaction file (e.g., transaction file 200d obscured at "card type" and "account" in transaction element 210d in FIG. 2). In those cases, a transaction element may still be properly recognized by a text recognition process later performed. However, in other cases, the transaction element may not be properly recognized, which may later cause the personal device to prompt the user to input information relating to the transaction element, as depicted and described with respect to FIG. 4.

As described above, after receiving the transaction files, the personal device may perform text recognition on the transaction files to extract the one or more transaction elements, 602a-602d, 604a-604d, 606a-606d, 608a-608d, and 610a-610d.

Example Method of Performing an Action Based on an Interactive Cell

Figure 7:
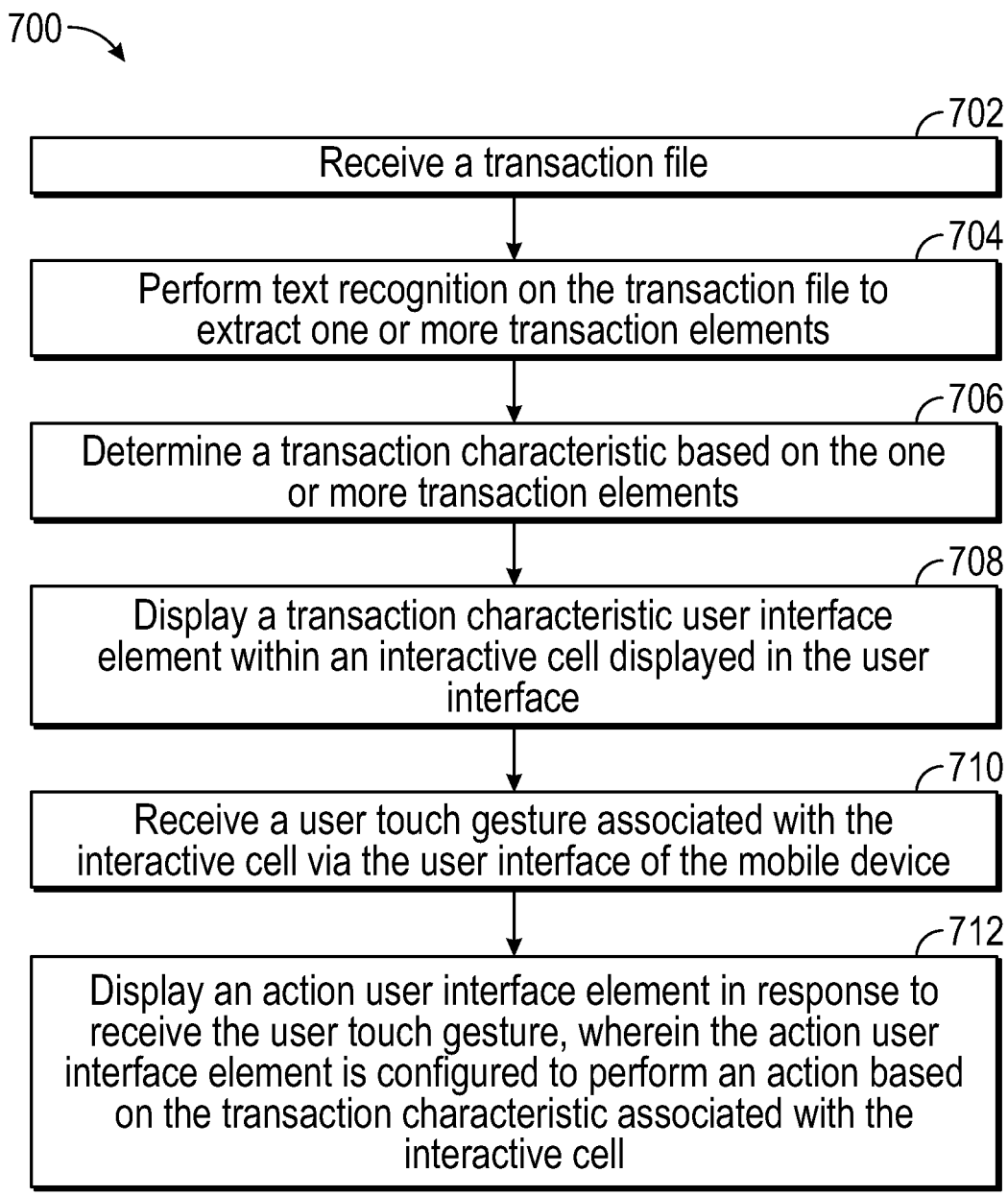
FIG. 7 depicts an example method of displaying a user interface with user interface components having dynamically determined functionality.

FIG. 7 depicts an example method 700 of performing an action determined by a personal device (e.g., personal device 104 of FIG. 1) based on an input user touch gesture to an interactive cell.

At 702, the personal device (e.g., personal device 104 in FIG. 1) receives one or more transaction files. The personal device may receive the transaction files from a server, such as server 102 in FIG. 1. In some cases, the personal device may capture one or more transaction files through a camera device. Each transaction file may represent a particular transaction document such as a bill, an invoice, or a receipt. The transaction file may also contain one or more transaction elements in the text of the document.

At 704, the text recognition is performed on the one or more transaction files to the extract one or more transaction elements. The personal device may perform text recognition on the one or more transaction files to extract the one or more transaction elements. In one embodiment, the server may perform text recognition on the transaction files and send the transaction elements to the personal device. In various embodiments, the text recognition performed may be optical character recognition (OCR).

At 706, the personal device determines a transaction characteristic based on the one or more transaction elements extracted from each transaction file by the text recognition process. The transaction characteristic may be a transaction category, such as "bill" or "expense". The personal device may then also determine an action associated with the transaction file based on the transaction characteristic for each transaction file and may later indicate that the user should input a touch gesture in order to cause the personal device to perform an associated action.

For example, if the transaction characteristic is a transaction category, and the transaction category is a "bill", the action determined by the personal device may be to create a bill transaction record. For further example, if the transaction category is an expense, the action determined by the personal device may be to create an expense transaction record. In addition, the action determined by the personal device may be based on whether an existing record in a transaction database (e.g., transaction database 126 of FIG. 1) corresponds to the transaction file. The personal device may receive one or more of the existing records from the server in order to analyze the record and compare the existing record to a potential record associated with a transaction file. If the personal device determines that an already existing record corresponds to a transaction file, the action determined by the personal device may be to match the transaction file to the existing record. Matching the transaction file to the existing record may include matching a transaction file and/or one or more transaction elements to the existing record.

At 708, the personal device displays a transaction characteristic user interface element within an interactive cell displayed in the user interface for each transaction file, where each interactive cell may be associated with one or more of the received transaction files. The transaction characteristic user interface element indicates the transaction characteristic associated with the transaction file. Further, the interactive cell may also display any combination of one or more transaction element user interface elements, a transaction preview user interface element, and an incompletion user interface element.

At 710, the personal device receives a user touch gesture, such as a swipe or a tap, from with the interactive cell via the user interface of the mobile device.

At 712, the personal device displays an action user interface element in response to receiving the user touch gesture, wherein the action user interface element is configured to perform an action based on the transaction characteristic associated with the transaction file of the interactive cell. The action to be performed by the personal device may be based on whether an existing record in a transaction database (e.g., transaction database 126 of FIG. 1) corresponds to the transaction file. For example, the personal device may receive one or more of the existing records from the server in order to analyze the record and compare the existing record to a potential record associated with a transaction file. If the personal device determines that an already existing record corresponds to a transaction file, the action determined by the personal device may be to match the transaction file to the existing record. Matching the transaction file to the existing record may include matching a transaction file and/or one or more transaction elements to the existing record In some embodiments, the action associated based on the transaction characteristic is an action described above with respect to FIGS. 3A-D and 5A-B. The personal device may determine the action based on analyzing the transaction elements and determining if a potential transaction record based on the transaction elements matches an existing transaction record. The personal device may determine if the potential transaction record matches an existing transaction record by identifying the existing transaction record and comparing it to the potential transaction record. After a potential transaction record based on the transaction file is created or matched, the created or matched transaction record may be stored in a transaction database with existing transaction records to be compared to new incoming records. In some embodiments, the personal device may perform another action to undo the creation or matching of the transaction record after receiving another touch gesture.

Example Processing Device for Displaying a User Interface

Figure 8:
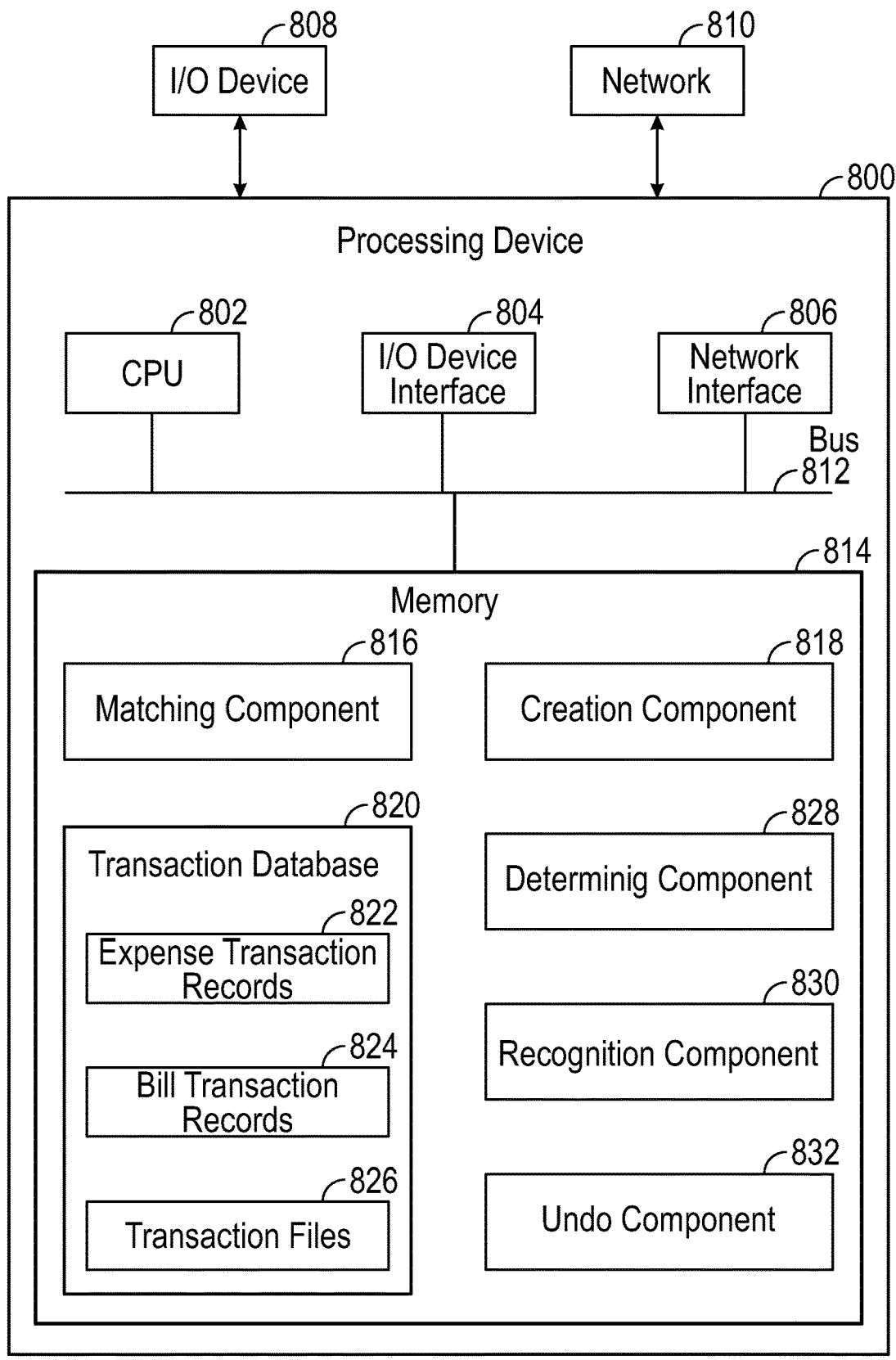
FIG. 8 depicts an example processing device.

FIG. 8 depicts an example processing device 800 that may perform the methods described herein, for example, as described with respect to FIG. 7. For example, the processing device 800 can be a physical processing device such as a laptop, tablet, or smartphone, and is not limited to a single processing device that performs the methods described herein, for example, with respect to FIG. 7.

Processing device 800 includes a central processing unit (CPU) 802 connected to a data bus 812. CPU 802 is configured to process computer-executable instructions, e.g., stored in memory 814, and to cause the processing device 800 to perform methods described herein, for example, with respect to FIG. 7. CPU 802 is included to be representative of a single CPU, multiple CPUs, a single CPU having multiple processing cores, and other forms of processing architecture capable of executing computer-executable instructions.

Processing device 800 further includes input/output (I/O) device(s) 808 and I/O device interfaces 804, which allows processing device 800 to interface with input/output devices 808, such as, for example, through pen input, microphones, and other devices that allow for interaction with processing device 800. Note that processing device 800 may connect with external I/O devices through physical and wireless connections (e.g., an external display device).

Processing device 800 further includes a network interface 806, which provides processing device 800 with access to external network 810 and thereby other processing devices, including servers (e.g., server 102 of FIG. 1) and other personal devices.

Processing device 800 further includes memory 814, which in this example includes a matching component 816, a creation component 818, a transaction database 820, a determining component 828, a recognition component 830, and an undo component 832 for performing operations as described with respect to FIG. 7. Matching component 816, creation component 818, and undo component 832 may all perform actions determined by determining component 828 with respect to interactive cells (e.g., interactive cells 204a-204d in FIG. 2) displayed on I/O device interfaces 804. Additionally, the determined actions may be determined based on information extracted by recognition component 830. Transaction database 820 may further include expense transaction records 822, bill transaction records 824, and transaction files 826, which determining component 828 may use in determining actions.

Note that while shown as a single memory 814 in FIG. 8 for simplicity, the various aspects stored in memory 814 may be stored in different physical memories, but all accessible by CPU 802 via internal data connections such as bus 812. While not depicted, other aspects may be included in memory 814.

Example Server

Figure 9:
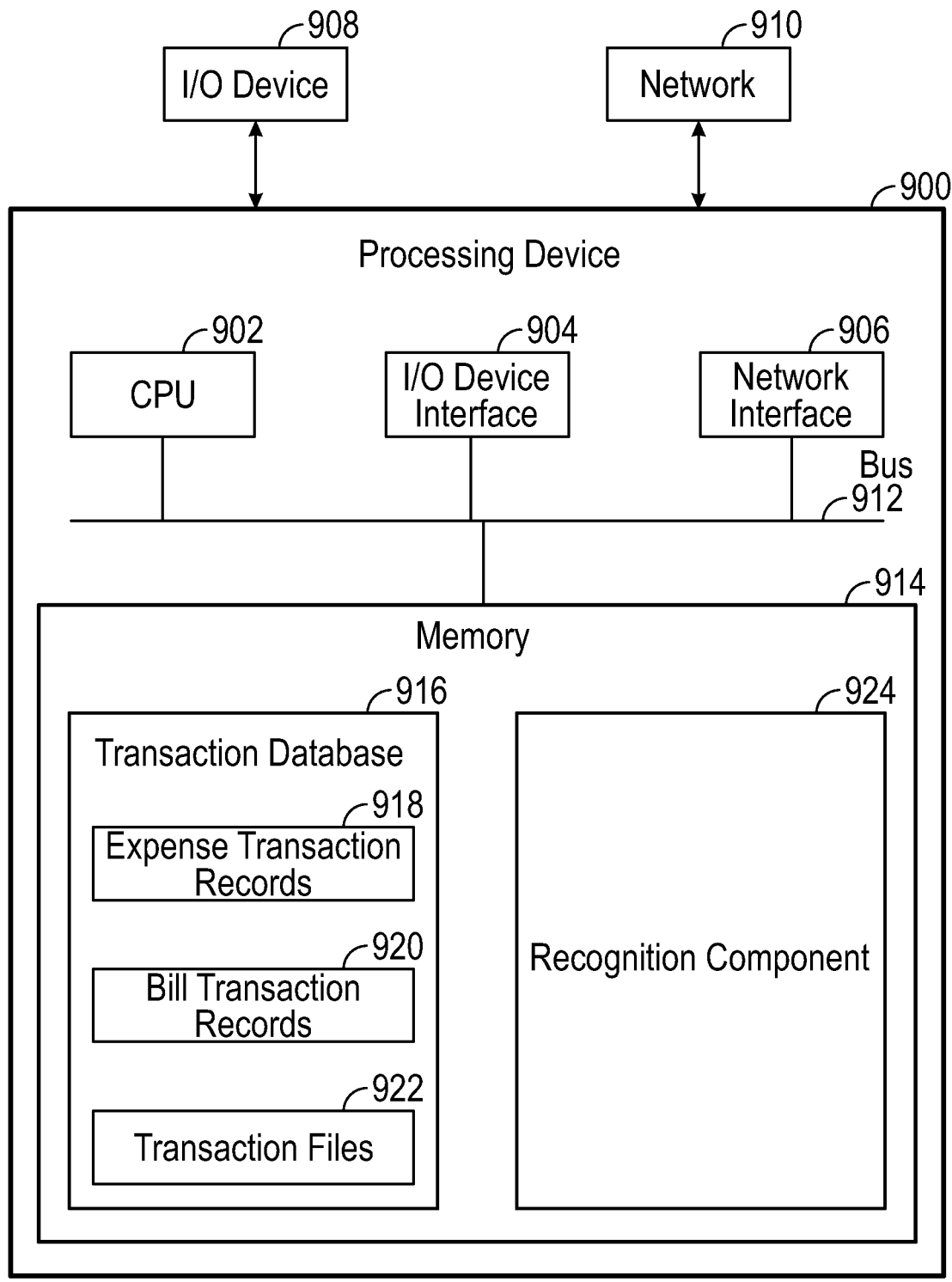
FIG. 9 depicts an example server.

FIG. 9 depicts an example processing device 900 that may perform the methods described herein. For example, the processing device 900 can be a physical processing device or virtual server and is not limited to a single processing device that performs the methods described above.

Processing device 900 includes a central processing unit (CPU) 902 connected to a data bus 912. CPU 902 is configured to process computer-executable instructions, e.g., stored in memory 914, and to cause the processing device 900 to perform methods described above. CPU 902 is included to be representative of a single CPU, multiple CPUs, a single CPU having multiple processing cores, and other forms of processing architecture capable of executing computer-executable instructions.

Processing device 900 further includes input/output (I/O) device(s) 908 and I/O device interfaces 904, which allows processing device 900 to interface with input/output devices 908, such as, for example, keyboards, displays, mouse devices, pen input, and other devices that allow for interaction with processing device 900. Note that processing device 900 may connect with external I/O devices through physical and wireless connections (e.g., an external display device).

Processing device 900 further includes a network interface 906, which provides processing device 900 with access to external network 910 and thereby external personal devices.

Processing device 900 further includes memory 914, which in this example includes a transaction database 916 and recognition component 924. In this example, transaction database 916 further includes expense transaction records 918, bill transaction records 920, and transaction files 922. Records and files may be retrieved from transaction database 916 by processing device 900 and may be sent to other processing devices, such as other servers or personal devices (e.g., personal device 104 in FIG. 1). Records and files may also be received from external processing devices (e.g., personal device 104 and third-party services device 128 in FIG. 1) by processing device 900 and stored in transaction database 916. Additionally, recognition component 924 may perform text recognition on transaction files to extract text elements, and may send the extracted text elements to external processing devices.

Note that while shown as a single memory 914 in FIG. 9 for simplicity, the various aspects stored in memory 914 may be stored in different physical memories, but all accessible by CPU 902 via internal data connections such as bus 912. While not depicted, other aspects may be included in memory 914.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of displaying a user interface on a mobile device, comprising:
   receiving a transaction file;
   performing text recognition on the transaction file to extract one or more transaction elements;
   determining if the transaction file comprises an expense or a bill based on the one or more transaction elements;
   determining whether the transaction file corresponds to an existing expense record or an existing bill record based on the one or more transaction elements;
   displaying an interactive cell corresponding to the transaction file in the user interface, wherein the interactive cell comprises:
      an indication of whether the transaction file comprises an expense or a bill; and
      an indication of whether the transaction file corresponds to an existing expense record or an existing bill record;
   receiving a user touch gesture associated with the interactive cell via the user interface;
   selecting, based on the transaction characteristic, an action user interface element from a set of action user interface elements comprising:
      a first action user interface element configured to cause the mobile device to create an expense record based on the one or more transaction elements;
      a second action user interface element configured to cause the mobile device to create a bill record based on the one or more transaction elements;
      a third action user interface element configured to cause the mobile device to match the transaction file to an existing expense record based on the one or more transaction elements; and
      a fourth action user interface element configured to cause the mobile device to match the transaction file to an existing bill record based on the one or more transaction elements;
   displaying the selected action user interface element in the interactive cell in response to receiving the user touch gesture; displaying an incompletion user interface element indicating that a set of the one or more transaction elements is not included in the transaction file; and
   receiving user input comprising the set of the one or more transaction elements.

2. The method of claim 1, further comprising performing one or more actions associated with the selected action user interface element upon receiving user input with respect to the action user interface element.

3. The method of claim 2, wherein the one or more actions comprise: storing the transaction file in a transaction database; and
   removing the interactive cell from the user interface.

4. The method of claim 1, wherein the action user interface element is selected in response to determining the transaction characteristic based on the one or more transaction elements.

5. The method of claim 1, further comprising:
   searching a transaction database based on the one or more transaction elements;
   identifying a stored transaction in the transaction database associated with the transaction
file based on the one or more transaction elements; and
   displaying a matching transaction user interface element within the interactive cell in the user interface.

6. The method of claim 4, further comprising:
   adjusting the one or more transaction elements based on user input; and
   determining a new action in response to the adjusting.

7. The method of claim 1, wherein determining the transaction characteristic based on the one or more transaction elements comprises one of:
   determining a transaction element of the one or more transaction elements is the transaction characteristic;
   receiving, from a machine learning model, the transaction characteristic after providing the one or more transaction elements to the machine learning model; or
   determining the one or more transaction elements indicate the transaction characteristic.

8. The method of claim 1, further comprising displaying a transaction element user interface element based on at least one of the one or more transaction elements.

9. A system, comprising: a processor; and a memory storing instructions, which when executed by the processor perform a method for displaying a user interface on a mobile device, comprising:

receiving a transaction file;

performing text recognition on the transaction file to extract one or more transaction elements;

determining if the transaction file comprises an expense or a bill based on the one or more transaction elements;

determining whether the transaction file corresponds to an existing expense record or an existing bill record based on the one or more transaction elements;

displaying an interactive cell corresponding to the transaction file in the user interface, wherein the interactive cell comprises:

an indication of whether the transaction file comprises an expense or a bill;

and an indication of whether the transaction file corresponds to an existing expense record or an existing bill record;

receiving a user touch gesture associated with the interactive cell via the user interface;

selecting, based on the transaction characteristic, an action user interface element from a set of action user interface elements comprising:

a first action user interface element configured to cause the mobile device to create an expense record based on the one or more transaction elements;

a second action user interface element configured to cause the mobile device to create a bill record based on the one or more transaction elements;

a third action user interface element configured to cause the mobile device to match the transaction file to an existing expense record based on the one or more transaction elements; and a fourth action user interface element configured to cause the mobile device to match the transaction file to an existing bill record based on the one or more transaction elements;

displaying the selected action user interface element in the interactive cell in response to receiving the user touch gesture;

displaying an incompletion user interface element indicating that a set of the one or more transaction elements is not included in the transaction file; and receiving user input comprising the set of the one or more transaction elements.

10. The system of claim 9, the method further comprising performing one or more actions associated with the selected action user interface element upon receiving user input with respect to the action user interface element.

11. The system of claim 10, wherein the one or more actions comprise: storing the transaction file in a transaction database; and removing the interactive cell from the user interface.

12. The system of claim 9, the method wherein the action user interface element is selected in response to determining the transaction characteristic based on the one or more transaction elements.

13. The system of claim 9, the method further comprising:

searching a transaction database based on the one or more transaction elements;

identifying a stored transaction in the transaction database associated with the transaction file based on the one or more transaction elements; and displaying a matching transaction user interface element within the interactive cell in the user interface.

14. The system of claim 12, the method further comprising:

adjusting the one or more transaction elements based on user input; and determining a new action in response to the adjusting.

15. The system of claim 9, wherein determining the transaction characteristic based on the one or more transaction elements comprises one of:

determining a transaction element of the one or more transaction elements is the transaction characteristic;

receiving, from a machine learning model, the transaction characteristic after providing the one or more transaction elements to the machine learning model; or determining the one or more transaction elements indicate the transaction characteristic.

\* \* \* \* \*